(12) United States Patent
Ashikawa

(10) Patent No.: US 6,853,516 B2
(45) Date of Patent: Feb. 8, 2005

(54) RECORDING TAPE CASSETTE

(75) Inventor: Teruo Ashikawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 160 days.

(21) Appl. No.: 10/385,686

(22) Filed: Mar. 12, 2003

(65) Prior Publication Data

US 2003/0174443 A1 Sep. 18, 2003

(30) Foreign Application Priority Data

Mar. 14, 2002 (JP) .................................... 2002-069837

(51) Int. Cl.⁷ .......................................... G11B 23/087
(52) U.S. Cl. ..................................................... 360/132
(58) Field of Search ........................ 360/132; 242/346, 242/346.1, 346.2

(56) References Cited

U.S. PATENT DOCUMENTS 4,466,585 A * 8/1984 Maehara ..................... 360/132
4,700,254 A * 10/1987 Oishi et al. ................. 360/132
5,677,817 A * 10/1997 Saitou et al. ............... 360/132

* cited by examiner

Primary Examiner—Robert S. Tupper
(74) Attorney, Agent, or Firm—Sughrue Mion, PLLC

(57) ABSTRACT

A recording tape cassette has a case formed from an upper case and a lower case, and in which a reel, on which a recording tape is wound, is accommodated; a shaft standing erect at the lower case; a guide roller fit with play at the shaft; and a holding hole provided at the upper case, and into which a distal end of the shaft is inserted with play. The holding hole has a guide surface which, when the case deforms, makes the distal end of the shaft move in a predetermined direction. In accordance with the recording tape cassette, conveying stability of the recording tape trained around on the guide roller can be ensured.

20 Claims, 5 Drawing Sheets

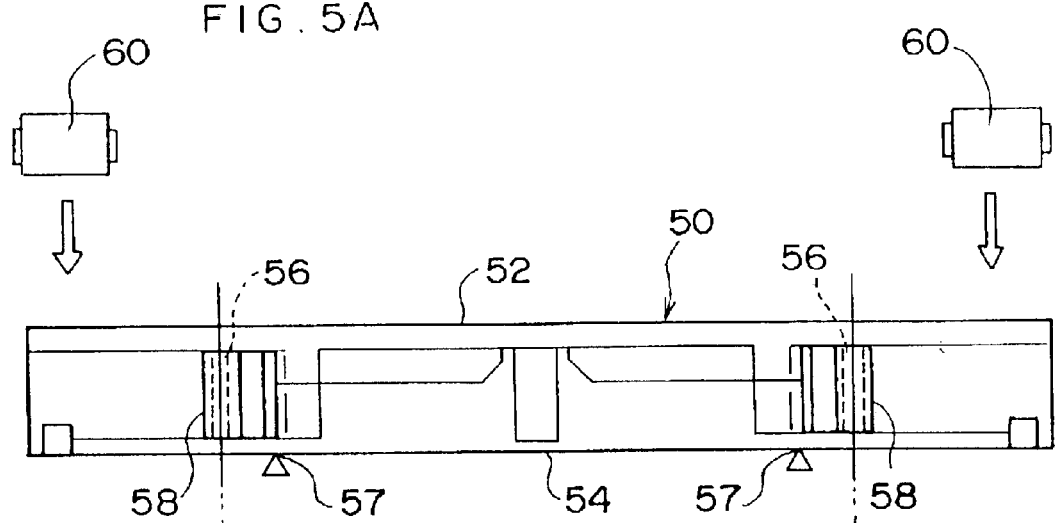
FIG. 5A
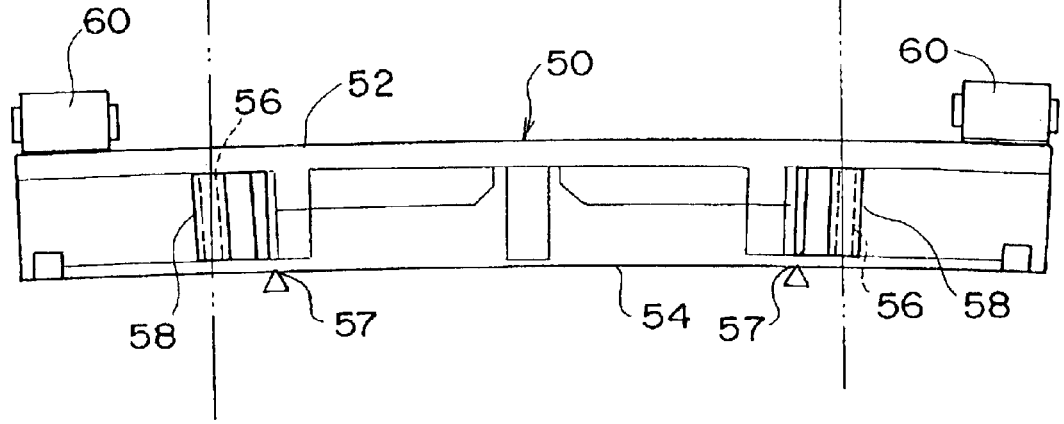
FIG. 5B
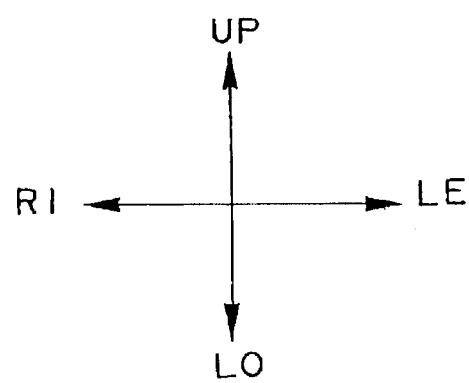

RECORDING TAPE CASSETTE

BACKGROUND OF THE INVENTION

1. Field of the Invention

The present invention relates to a recording tape cassette which accommodates, within a case, reels on which a recording tape such as a magnetic tape or the like is wound, and which is provided with guide rollers which guide the conveying of the recording tape.

2. Description of the Related Art

Magnetic tape cassettes, which are provided with magnetic tapes as recording tapes, are widely used in audio equipment, video equipment and the like which are recording/playback devices. For example, in a magnetic tape cassette which is used for business at a broadcasting station or the like, a pair of reels are rotatably accommodated within a case which is formed by joining together an upper case and a lower case made of a synthetic resin. Usually, the magnetic tape is wound on one reel, and the distal end of the magnetic tape is attached to the other reel. Due to the magnetic tape being drawn out from the one reel to the other reel, information is recorded onto the magnetic tape, or information recorded on the magnetic tape is played back.

Each reel on which the magnetic tape is wound is formed by a lower flange, a hub fixed integrally to the top side of the lower flange, and an upper flange mounted to the top side of the hub. The distal end of the magnetic tape is attached to the hub, and the magnetic tape is wound on the outer peripheral surface of the hub.

At a center of the front wall of the case, the magnetic tape is exposed such that a recording/playback head of a recording/playback device can slidingly contact the magnetic tape. When the magnetic tape cassette is not being used (i.e., when the magnetic tape cassette is not loaded in a recording/playback device), the front wall of the case is covered by a cover. This cover is formed so as to be rotatable upwardly. When the magnetic tape cassette is being used (i.e., when the magnetic tape cassette is loaded in a recording/playback device), the cover is withdrawn to above the case such that the magnetic tape is exposed.

As shown in FIG. 5A, shafts 56, which are long, thin, solid cylinders formed of metal, stand erect perpendicularly to a lower case 54 at the inner surface of the front portion of the lower case 54. Guide rollers 58 formed of a synthetic resin are fit with play at the shafts 56. The upper ends (distal ends) of the shafts 56 are fit into circular holding holes (not illustrated) of an upper case 52. Accordingly, the guide rollers 58 are pivotally supported at the shafts 56 so as to rotate freely. When the magnetic tape is drawn out or rewound while being efficiently guided by the guide rollers 58, the conveying stability thereof is ensured.

Reference holes 57 for positioning the case with respect to a recording/playback device are formed in the bottom surface of the front portion of the lower case 54, further toward the inner side than the guide rollers 58. (The reference holes 57 are formed at the positions denoted by the triangles in FIGS. 5A and 5B.) When a magnetic tape cassette 50 is loaded into a recording/playback device, positioning members (not illustrated) such as pins or the like enter into the reference holes 57, such that the position of the magnetic tape cassette 50 within the recording/playback device is regulated.

Holding members 60, such as rubber rollers or the like, are abutted by portions of the top surface of the upper case 52 which portions are at the outer sides (in the left-right direction of the case) of the guide rollers 58. When the magnetic tape cassette 50 is loaded in the recording/playback device, the holding members 60 press the magnetic tape cassette 50 from above, and hold the magnetic tape cassette 50 within the recording/playback device.

However, when the portions of the top surface of the magnetic tape cassette 50 (the top surface of the upper case 52), which portions are at the outer sides (in the left-right direction of the case) of the reference holes 57 and the guide rollers 58, are pressed by the holding members 60 such as rubber rollers in this way, as shown in FIG. 5B, there are cases in which the left-right direction both end sides of the magnetic tape cassette 50 slightly flexurally deform downward with the reference holes 57 being the fulcra. When such flexural deformation arises, because the shafts 56 are fixed to the upper case 52 and the lower case 54, there are cases in which the guide rollers 58 which are rotatably supported at the shafts 56 follow this flexural deformation and incline toward the left and right outer sides such that the conveying of the magnetic tape is unstable.

In other words, even if the guide rollers 58 (the shafts 56) stand erect perpendicularly to the upper case 52 and the lower case 54 in order to stabilize the conveying of the magnetic tape, the magnetic tape tends to be guided in a state in which the guide rollers 58 are inclined toward the left and right outer sides, due to the holding members 60 of the recording/playback device. Therefore, within the recording/playback device, the magnetic tape which is wound on the guide rollers 58 tends to be conveyed while the heightwise position thereof varies upwardly and downwardly. As a result, the conveying stability of the magnetic tape deteriorates. When such a phenomenon occurs, there may arise the magnetic tape is guided in a state in which the guide rollers 58 are inclined toward the left and right outer sides. the magnetic tape is guided in a state in which the guide rollers 58 are inclined toward the left and right outer sides.cases in which information cannot be recorded onto the magnetic tape, and information recorded on the magnetic tape cannot be played back.

SUMMARY OF THE INVENTION

An object of the present invention is to provide a recording tape cassette which, when loaded in a recording/playback device, even if flexural deformation or the like arises at the recording tape cassette, can ensure the conveying stability of a recording tape wound on guide rollers.

In order to achieve the above-described object, a recording tape cassette relating to the present invention comprises: a case formed from an upper case and a lower case, and in which a reel, on which a recording tape is wound, is accommodated; a shaft standing erect at the lower case; a guide roller fit with play at the shaft; and a holding hole provided at the upper case, and into which a distal end of the shaft is inserted with play, wherein the holding hole has a guide surface which, when the case deforms, makes the distal end of the shaft move in a predetermined direction.

In accordance with the present invention, even if, for example, downwardly-directed flexural deformation arises at the left-right direction both end sides of the case, because the distal end (upper end) of the shaft is inserted with play in the holding hole, the distal end (upper end) of the shaft moves within the holding hole. A certain amount of the aforementioned flexural deformation can thereby be permitted. Further, the guide surface, which makes the distal end (upper end) of the shaft move in the predetermined direction, is formed within the holding hole. Therefore, the guide roller, which is fit with play at the shaft, is reliably supported at a suitable posture. Accordingly, the conveying stability of the recording tape is ensured.

BRIEF DESCRIPTION OF THE DRAWINGS

FIG. 5A is a schematic front view of a conventional magnetic tape cassette.

FIG. 5B is a schematic front view showing a state after the magnetic tape cassette of FIG. 5A has been loaded into a recording/playback device.

DETAILED DESCRIPTION OF THE PREFERRED EMBODIMENTS

Hereinafter, embodiments of the present invention will be described in detail with reference to the drawings. Note that, for convenience of explanation, the direction of loading the recording tape cassette into a recording/playback device is called the front direction (FR), and the rear direction (RE), the upward direction (UP), the downward direction (LO), the left direction (LE) and the right direction (RI) are defined with the front direction being used as the reference. Further, a magnetic tape is used as the recording tape, and a magnetic tape cassette designated by 10 will be described hereinafter.

Figure 1:
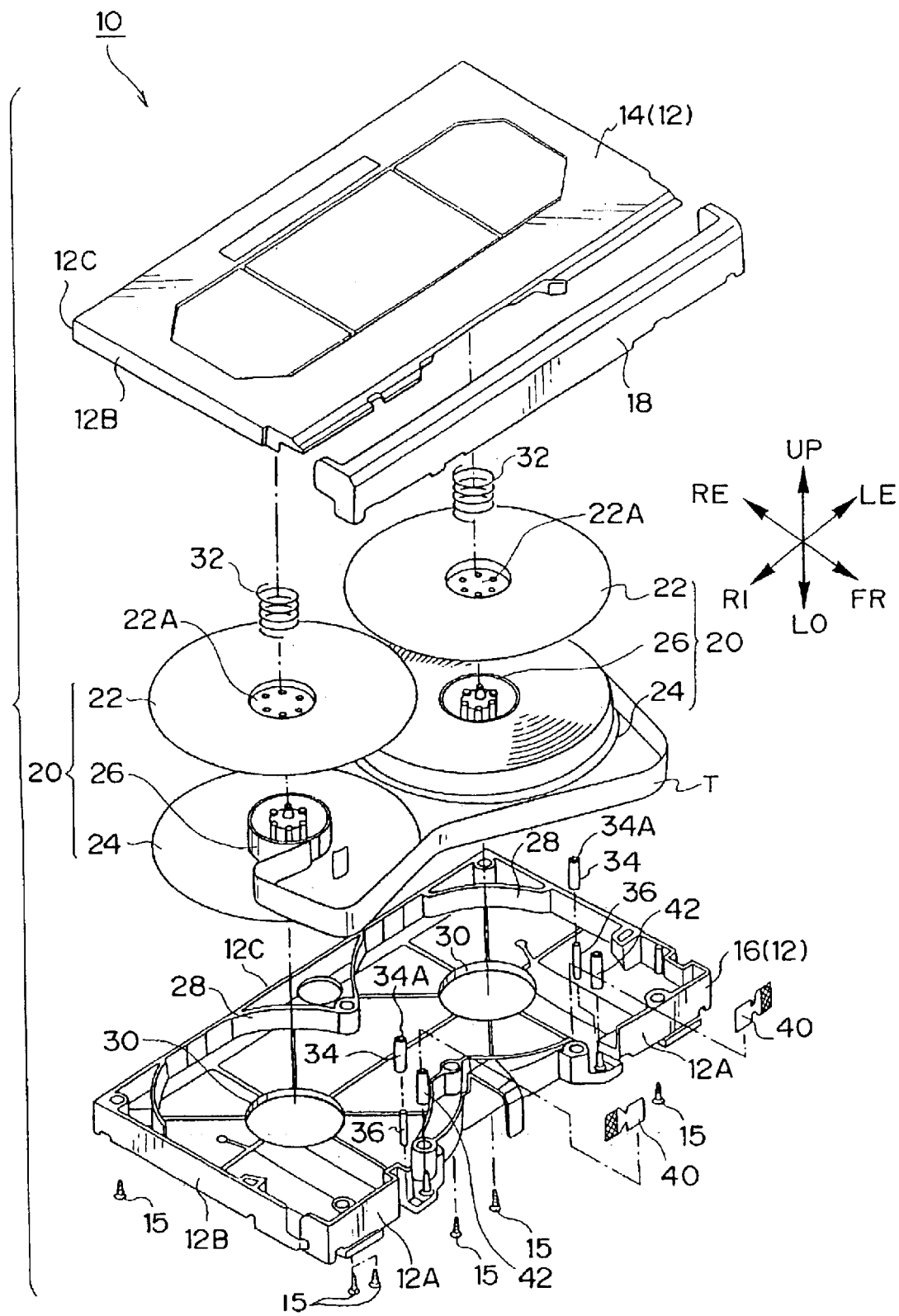
FIG. 1 is a schematic exploded perspective view of a magnetic tape cassette relating to the present invention, as seen from diagonally above.

First, to summarily describe the magnetic tape cassette 10, as shown in FIG. 1, the magnetic tape cassette (betacam L cassette) 10, which is used for business such as at a broadcasting station or the like, has a substantially rectangular box-shaped case 12 whose left-right direction dimension is longer than the front-back direction dimension thereof. The case 12 is formed by joining an upper case 14 and a lower case 16 together by a plurality of mounting screws 15 which are screwed in from the bottom surface of the lower case 16. A cover 18 which covers a front wall 12A of the case 12 is provided at the front wall 12A.

The both end portions of the cover 18 are pivotally supported at the front ends of side walls 12B of the case 12. The cover 18 covers a magnetic tape T which is exposed at the center of the front wall 12A of the case 12. Namely, when the magnetic tape cassette 10 is not loaded in a recording/playback device such as audio equipment, video equipment or the like, the cover 18 is disposed in front of the front wall 12A of the case 12 so as to cover the magnetic tape T. When the magnetic tape cassette 10 is loaded in a recording/playback device, the cover 18 is pivoted and withdrawn toward the upper side of the upper case 14 such that a recording/playback head (not illustrated) can slidingly contact the magnetic tape T which is exposed at the center of the front wall 12A of the case 12.

A pair of play regulating walls 28, which are formed in substantially cylindrical shapes, stand erect at the inner side of the lower case 16. A pair of reels 20 are rotatably accommodated within the play regulating walls 28. Each reel 20 is formed by a lower flange 24, a hub 26 fixed integrally to the top side of the lower flange 24, and an upper flange 22 which is mounted to the top side of the hub 26. When the magnetic tape cassette 10 is not being used, usually, the magnetic tape cassette 10 is substantially wound up about the hub 26 of either one of the reels 20, whereas one end of the magnetic tape T is attached to the hub 26 of the one of the reels 20 and the other end of the magnetic tape T is attached to the hub 26 of the other reel 20.

A concave portion 22A is formed in the center of the top surface of the upper flange 22. A compression coil spring 32 is inserted within the concave portion 22A. The bottom end of the compression coil spring 32 is supported at the bottom surface of the concave portion 22A. The top end of the compression coil spring 32 is supported at the inner surface of the upper case 14. The compression coil springs 32 urge the reels 20 toward the lower case 16. A pair of open holes 30 are formed in the lower case 16. Unillustrated gears for reel rotation, which are provided at the bottom surfaces of the respective reels 20, emerge out from these open holes 30.

Figure 2:
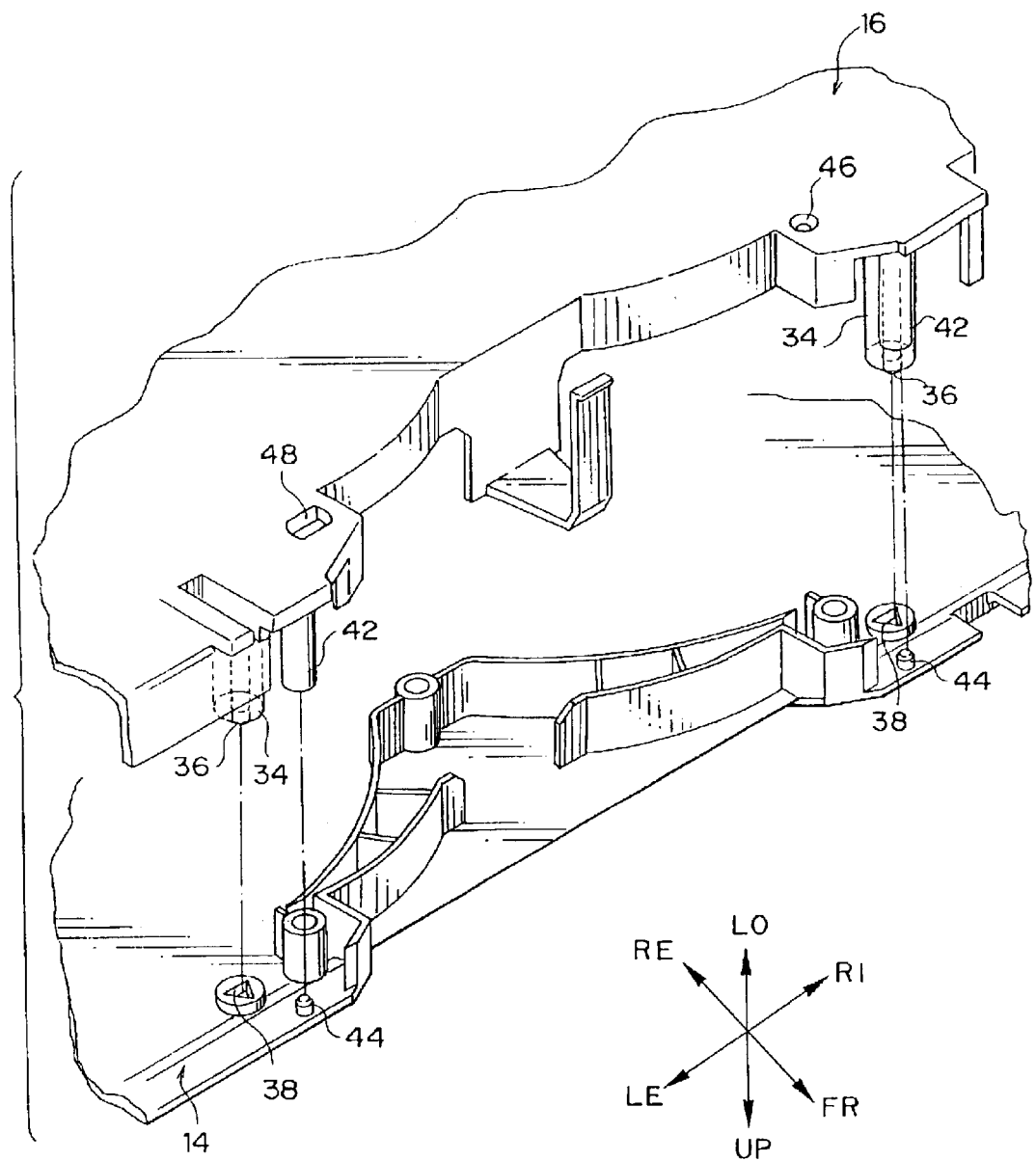
FIG. 2 is a schematic exploded perspective view of a front wall side main portion of the magnetic tape cassette of FIG. 1, as seen from diagonally below.

As shown in FIG. 2, reference holes 46, 48 for positioning the cassette with respect to a recording/playback device are formed in the bottom surface of the front portion of the lower case 16. Among these reference holes 46, 48, the one (at the right-hand side, as viewed in FIG. 2) reference hole 46 is circular in plan view, whereas the other (at the left-hand side, as viewed in FIG. 2) reference hole 48 is, as seen in plan view, substantially an oval which is long along the left-right direction. Accordingly, when the magnetic tape cassette 10 is loaded into a recording/playback device, positioning members (not illustrated) such as pins or the like enter into the reference holes 46, 48, such that the front-back direction and left-right direction position of the magnetic tape cassette 10 within the recording/playback device is regulated.

A pair of shafts 36, which are long, thin, solid-cylindrical, and formed of metal, stand erect so as to be perpendicular to the lower case 16, at the inner surface of the front portion of the lower case 16 at positions which are further toward the case left-right direction outer sides than the reference holes 46, 48. Guide rollers 34, which are formed of a synthetic resin and each of which has a through hole 34A formed therein, are fit with play on the shafts 36 by way of the through hole 34A, respectively. The through hole 34A is round in plan view and formed in the guide roller 34 along the central axis thereof. A pair of holding holes 38 are provided at the inner surface of the front portion of the upper case 14. The upper ends (distal ends) of the shafts 36 are inserted with play and held in the holding holes 38.

The guide rollers 34 are supported so as to be rotatable around the shafts 36, and are held in a state of being perpendicular with respect to the lower case 16 and the upper case 14. The magnetic tape T is conveyed (is either drawn out or rewound) stably from one of the reels 20 to the other reel 20, while the magnetic tape T is guided by the guide rollers 34. Thus, it is preferable to form the guide rollers 34 of a synthetic resin which is smooth and which has relatively high mechanical strength, e.g., a resin such as POM or the like.

Figure 3A:
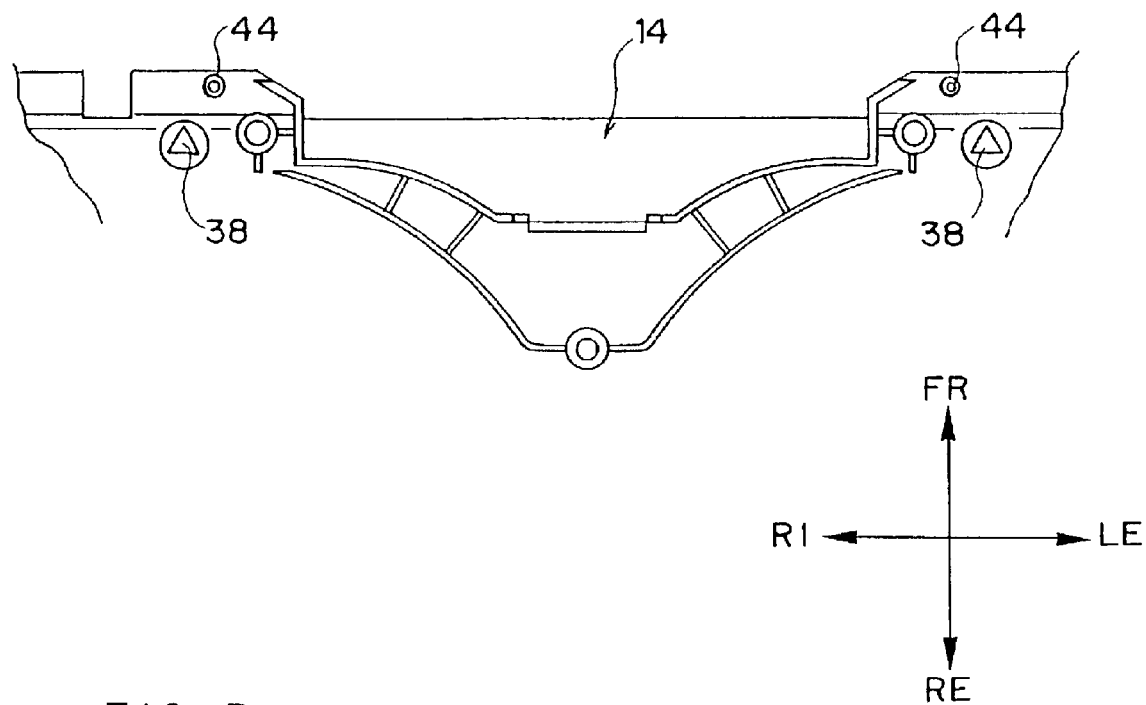
FIG. 3A is a schematic plan view showing holding hole portions provided in an upper case of the magnetic tape cassette of FIG. 1.
Figure 3B:
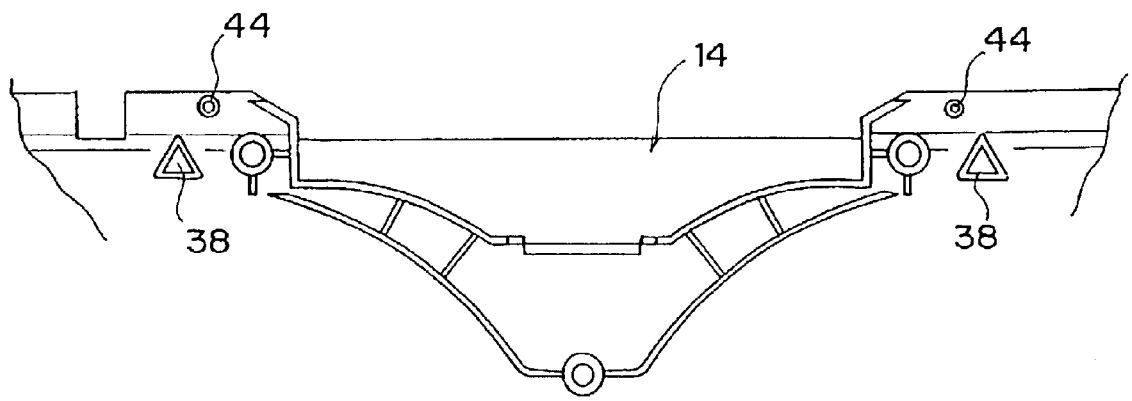
FIG. 3B is a schematic plan view showing a modified example of the holding hole portions provided in the upper case of the magnetic tape cassette of FIG. 1.

As shown in FIGS. 2 and 3A, the holding hole 38 provided in the upper case 14 is formed such that a substantially equilateral triangle shape, whose vertex is at the front side, is formed concavely in the interior of a solid cylinder projecting to a predetermined height. Or, as shown in FIG. 3B, the holding hole 38 is formed as a substantially equilateral triangular tube whose vertex is at the front side.

Figure 4A:
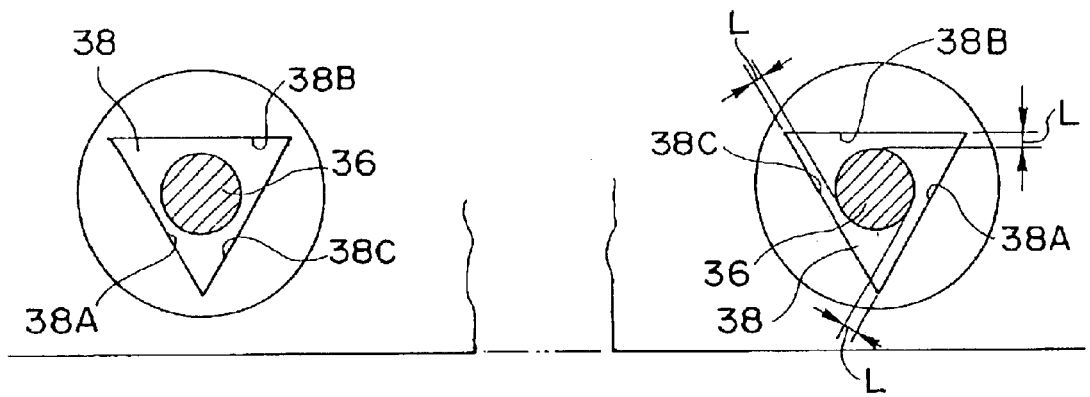
FIG. 4A is a schematic plan view showing a state of the holding hole portions before loading of the cassette into a recording/playback device.

The upper end (distal end) of the shaft 36 is inserted with play in the holding hole 38 in a state of having some room, e.g., the state shown in FIG. 4A in which, when the center of the shaft 36 is disposed at the inner center of the holding hole 38 which is formed in a substantially equilateral triangular shape as seen in plan view, a minimum distance L from the outer peripheral surface of the shaft 36 to each of a case left-right direction outer side inclined side 38A, a rear side base 38B, and a case left-right direction inner side inclined side 38C, which form the holding hole 38, is an interval of about 0.3 mm as seen in plan view.

Figure 4B:
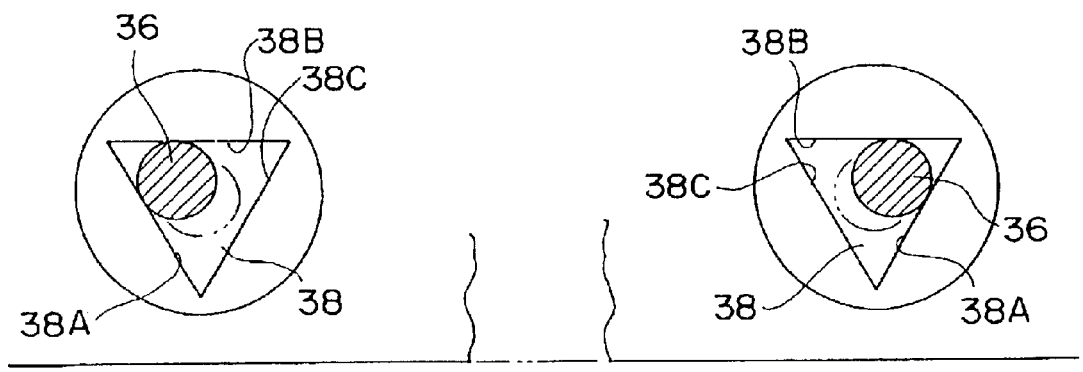
FIG. 4B is a schematic plan view showing a state of the holding hole portions after loading of the cassette into the recording/playback device.
Figure 4B:
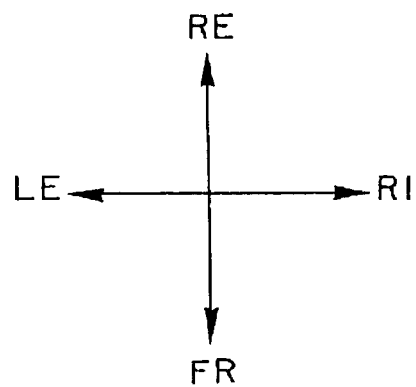

Accordingly, even if, when the magnetic tape cassette 10 is loaded in the recording/playback device, the top surface at the both left-right direction ends of the upper case 14 is pushed from above by the holding members 60 (see FIGS. 5A and 5B) formed by rubber rollers or the like, and the both left-right direction end sides of the case 12 slightly flexurally deform downwardly with the portions where the reference holes 46, 48 are provided serving as fulcra, as shown in FIG. 4B, the top ends (distal ends) of the shafts 36 can move to positions of being inscribed by both the (case left-right direction) outer side inclined sides 38A and the rear side bases 38B of the holding holes 38 which are shaped as substantially equilateral triangles as seen in plan view. Thus, a certain amount of flexural deformation is permitted.

Here, the front side of the magnetic tape T in the direction of loading into the recording/playback device is called the "front side". At the magnetic tape T which is wound at a predetermined tension and over substantially one-half of the circumference of each guide roller 34 which is supported perpendicularly with respect to the lower case 16, it is generally easy for the heightwise position (conveying position) of the magnetic tape T to fall downwardly when the guide rollers 34 are inclined forwardly from the perpendicular state. Conversely, it is generally easy for the heightwise position (conveying position) of the magnetic tape T to rise upward when the guide rollers 34 incline rearward. Accordingly, in general, when the magnetic tape T is guided in a state in which the guide rollers 34 are tilted slightly rearward in the loading direction, the magnetic tape T can be guided with better balance and more suitably than a case in which the guide rollers 34 are guiding the magnetic tape in a forwardly tilted state.

In the present embodiment, while the top ends (distal ends) of the shafts 36 are displaced slightly further rearward (in the loading direction) than the positions of the centers (inner centers) of the holding holes 38, the top ends of the shafts 36 move outwardly in the left-right direction of the case, and are held in a state of being inscribed by the inclined sides 38A and the bases 38B. Namely, the guide rollers 34 are held in a state of being slightly inclined rearwardly (see FIG. 4B). Accordingly, the magnetic tape T which is trained around the guide rollers 34 is guided such that the heightwise position (conveying position) thereof is displaced slightly upwardly. Therefore, the magnetic tape T can be guided suitably and with good balance, and the conveying stability can be ensured in the same way as a case in which the guide rollers 34 are held in a perpendicular state.

The holding hole 38 is formed in a substantially triangular shape, as seen in plan view, whose vertex is at the front side and whose base (which opposes the vertex) is at the rear side as seen in plan view. In particular, the holding hole 38 is optimally formed as a substantially equilateral triangle as seen in plan view. However, the configuration of the holding hole 38 is not limited to the illustrated configurations, and, for example, may be substantially isosceles triangular in plan view, substantially parallelogram shaped in plan view, substantially trapezoidal in plan view, or the like.

Namely, what is important as a critical feature in the present invention is, in addition to that the top ends (distal ends) of the shafts 36 can move within the holding holes 38 when the case 12 flexurally deforms, that guiding wall surfaces which form acute angles in plan view and which can guide the top ends (distal ends) of the shafts 36 in predetermined directions (toward predetermined regions) are provided within the holding holes 38. As illustrated, it suffices to provide holding holes 38 which each have a wall surface (the base 38B) parallel to the front wall 12A and a rear wall 12C of the case 12 at RE side, and, at the left side and/or right in predetermined directions (toward predetermined regions). t side, a wall surface (the inclined side 38A) which forms an acute angle in plan view with that wall surface (the base 38B).

In addition, tape pads 40 are provided in vicinities of the guide rollers 34. The tape pads 40 slidingly contact the reverse surface side of the magnetic tape T, and press the magnetic tape T from the reverse surface side, and prevent the magnetic tape T from going slack. The magnetic tape T is conveyed while being pushed by the tape pads 40 at an appropriate urging force. Accordingly, problems such as the magnetic tape T being bitten-into or scratched do not arise.

Further, metal, tubular shafts 42 stand erect at the inner surface of the lower case 16 between the guide rollers 34 and the reference holes 46, 48, further forward than the tape pads 40. Projections 44 projecting from the upper case 14 are fit into these tubular shafts 42.

The operation of the magnetic tape cassette 10 having the above-described structure will be described herein after. When the magnetic tape cassette 10 is not being used (is not loaded in a recording/playback device), the magnetic tape T is stored in a state of being wound on the one reel 20 and only the distal end of the magnetic tape T being attached to the other reel 20. The front wall 12A of the case 12 is covered by the cover 18.

At this time, the guide rollers 34 stand erect perpendicularly to the upper case 14 and the lower case 16. Namely, the bottom ends of the shafts 36 are fixed in a state of being perpendicular to the lower case 16, and the top ends (distal ends) of the shafts 36 are inserted and held with play such that the centers thereof are positioned at the centers (inner centers) of the holding holes 38 which are substantially equilateral triangular in plan view.

When the magnetic tape cassette 10 is to be used, the magnetic tape cassette 10 is loaded into a recording/playback device. When the magnetic tape cassette 10 is loaded into a recording/playback device, the holding members 60, which are rubber rollers or the like and which are shown in FIGS. 5A and 5B, push the left-right direction both end sides of the magnetic tape cassette 10 (the upper case 14) from above. The cover 18 is rotated upward so as to withdraw, and the magnetic tape T is exposed.

When the left-right direction both end sides of the upper case 14 are pushed by the holding members 60, the left-right direction both end sides of the case 12 slightly flexurally deform downward, with the portions where the reference holes 46, 48 are provided being the fulcra. Because the shafts 36 stand erect perpendicularly with their bottom ends fixed to the lower case 16, the shafts 36 follow this flexural deformation, and tilt toward the outer sides in the left-right direction of the case. Namely, the upper ends (distal ends) of the shafts 36 move within the holding holes 38 toward the outer sides in the left-right direction of the case, and a certain amount of flexural deformation is permitted.

As described above, the holding holes 38 are formed in substantially equilateral triangular configurations as seen in plan view, with the vertices being at the front side (in the direction of loading the cassette into the recording/playback device) and with their bases being at the rear side. Therefore, as the upper ends (top ends) of the shafts 36 move within the holding holes 38 toward the outer sides in the left-right direction of the case, the top ends of the shafts 36 are slightly displaced rearward, and are held at positions inscribed by the bases 38B and the inclined sides 38A at the outer sides in the left-right direction of the case.

In this way, the guide rollers 34 (the shafts 36) are held in a state of being tilted slightly rearward. Therefore, the magnetic tape T can be guided efficiently, suitably, and with good balance. The conveying stability of the magnetic tape T is thus ensured in the same way the upper ends (distal ends) of the shafts 36 move within the holding holes 38 toward the outer sides in the left-right direction of the case, the upper ends (distal ends) of the shafts 36 move within the holding holes 38 toward the outer sides in the left-right direction of the case, as when the guide rollers 34 are held in a perpendicular state.

While the magnetic tape T is being paid out from the one reel 20 to the other reel 20, the magnetic tape T is exposed from the center of the front wall 12A of the case 12. The recording/playback head of the recording/playback device slidingly contacts this exposed portion of the magnetic tape T such that recording or playback of information is carried out.

When the magnetic tape cassette 10 is to be taken out from the recording/playback device, the front wall 12A of the case 12 is covered by the cover 18, and the pushing by the holding members 60 is released. Therefore, the flexural deformation of the case 12 disappears. Namely, the top ends (distal ends) of the shafts 36 return to the central positions (inner centers) of the holding holes 38, and are held at these positions. The guide rollers 34 are held in perpendicular states with respect to the upper case 14 and the lower case 16.

As described above, in accordance with the present invention, even if flexural deformation arises at the case, the guide rollers can suitably guide the recording tape, and therefore, the conveying stability of the recording tape can be ensured.

What is claimed is:

1. A recording tape cassette comprising:
   a case formed from an upper case and a lower case, and in which a reel, on which a recording tape is wound, is accommodated;
   a shaft standing erect at the lower case;
   a guide roller fit with play at the shaft; and
   a holding hole provided at the upper case, and into which a distal end of the shaft is inserted with play,
   wherein the holding hole has a guide surface which, when the case deforms, makes the distal end of the shaft move in a predetermined direction.

2. The recording tape cassette of claim 1, wherein the guide surface converts positional displacement of the distal end of the shaft at a time of deformation of the case, into positional displacement thereof toward a rear side in a direction of loading the case.

3. The recording tape cassette of claim 1, wherein the holding hole has another guide surface which impedes displacement, of the distal end of the shaft, of more than a predetermined magnitude toward a rear side in a direction of loading the case.

4. The recording tape cassette of claim 1, wherein the guide surface has two wall surfaces, and one wall surface can convert positional displacement of the distal end of the shaft at a time of deformation of the case into displacement toward a rear side in a direction of loading the case, and another wall surface impedes positional displacement, of the distal end of the shaft, of more than a predetermined magnitude toward the rear side in the direction of loading the case.

5. The recording tape cassette of claim 4, wherein the other wall surface is substantially perpendicular with respect to the direction of loading the case, and the one wall surface forms an acute angle, in plan view, with the other wall surface.

6. The recording tape cassette of claim 5, wherein the guide surface is formed as one of a substantial isosceles triangle in plan view, a substantial parallelogram in plan view, and a substantial trapezoid in plan view.

7. The recording tape cassette of claim 6, wherein the guide surface is a substantial equilateral triangle in plan view.

8. The recording tape cassette of claim 7, wherein, in plan view, the guide surface is the substantial equilateral triangle with a vertex being positioned at a front side in the direction of loading the case and a base, which opposes the vertex, being positioned at the rear side in the direction of loading the case.

9. The recording tape cassette of claim 8, wherein the distal end of the shaft is inserted in the holding hole such that a center of the shaft is positioned at an inner center of the substantial equilateral triangle in plan view.

10. The recording tape cassette of claim 1, wherein the predetermined direction in which the distal end of the shaft is moved is a direction of stabilizing taking-up of the recording tape onto the reel.

11. A recording tape cassette comprising:
    a case formed from an upper case and a lower case, and in which a pair of reels, on which a recording tape is wound, are accommodated;
    a shaft standing erect at the lower case;
    a guide roller fit with play at the shaft, and guiding the recording tape which is being taken-up from one of the reels onto another of the reels; and
    a holding hole provided at the upper case, and into which the distal end of the shaft is inserted with play,
    wherein the holding hole has a guide surface along which the distal end of the shaft can slide, and the guide surface is formed such that, when the case is loaded into a recording/playback device and the case deforms, the guide surface converts positional displacement of the distal end of the shaft due to deformation of the case into positional displacement in a direction in which taking-up of the recording tape onto the reel is stabilized.

12. The recording tape cassette of claim 11, wherein the direction in which taking-up of the recording tape onto the reel is stabilized is a rear side in a direction of loading the case.

13. The recording tape cassette of claim 11, wherein the holding hole has another guide surface which impedes displacement, of the distal end of the shaft, of more than a predetermined magnitude in the direction in which taking-up of the recording tape onto the reel is stabilized.

14. The recording tape cassette of claim 11, wherein the guide surface has two wall surfaces, and one wall surface can convert positional displacement of the distal end of the shaft at a time of deformation of the case into displacement toward a rear side in a direction of loading the case, and another wall surface impedes positional displacement, of the distal end of the shaft, of a predetermined magnitude or more toward the rear side in the direction of loading the case.

15. The recording tape cassette of claim 14, wherein the one wall surface is substantially perpendicular with respect to a direction of loading the case, and the other wall surface forms an acute angle, in plan view, with the one wall surface.

16. The recording tape cassette of claim 15, wherein the guide surface is formed as one of a substantial isosceles triangle in plan view, a substantial parallelogram in plan view, and a substantial trapezoid in plan view.

17. The recording tape cassette of claim 16, wherein the guide surface is a substantial equilateral triangle in plan view.

18. The recording tape cassette of claim 17, wherein, in plan view, the guide surface is the substantial equilateral triangle with a vertex being positioned at a front side in the direction of loading the case and a base, which opposes the vertex, being positioned at the rear side in the direction of loading the case.

19. The recording tape cassette of claim 18, wherein the distal end of the shaft is inserted in the holding hole such that a center of the shaft is positioned at an inner center of the substantial equilateral triangle in plan view.

20. A recording tape cassette comprising:

a case formed by an upper case and a lower case, and formed in a shape of a substantial rectangle in plan view;

a shaft standing erect at the lower case;

a roller fit with play at the shaft; and a holding hole provided at the upper case, and into which a distal end of the shaft is inserted, wherein the holding hole has a guide surface along which the distal end of the shaft can slide, and the guide surface is formed to have at least two wall surfaces, and one wall surface is substantially parallel to one side of the substantial rectangle, and another wall surface forms an acute angle, in plan view, with the one wall surface, and the distal end of the shaft which has slid a predetermined distance is stably nipped by the two wall surfaces.

* * * * *

UNITED STATES PATENT AND TRADEMARK OFFICE
CERTIFICATE OF CORRECTION

PATENT NO.        : 6,853,516 B2
APPLICATION NO.   : 10/385686
DATED             : February 8, 2005
INVENTOR(S)       : Teruo Ashikawa It is certified that error appears in the above-identified patent and that said Letters Patent is hereby corrected as shown below:

Title Page #56
References Cited

Japanese Patent Application Laid-open (JP-A) No. 07-45031
JP-A No. 08-22686
US Patent No. 4,371,131
US Patent No. 5,765,772

Signed and Sealed this

Fifth Day of September, 2006

JON W. DUDAS
*Director of the United States Patent and Trademark Office*